United States Patent [19]

Bucceri

[11] Patent Number: 4,793,142
[45] Date of Patent: Dec. 27, 1988

[54] METHOD FOR MAKING ARTIFICIAL SNOW

[75] Inventor: Alfio Bucceri, Newmarket, Australia

[73] Assignee: Permasnow (Australasia) Limited, Queensland, Australia

[21] Appl. No.: 22,639

[22] PCT Filed: Jun. 3, 1986

[86] PCT No.: PCT/AU86/00158

§ 371 Date: Feb. 3, 1987

§ 102(e) Date: Feb. 3, 1987

[87] PCT Pub. No.: WO86/07373

PCT Pub. Date: Dec. 18, 1986

[30] Foreign Application Priority Data

Jun. 4, 1985 [AU] Australia .................. PH0877

[51] Int. Cl.$^4$ ................................ F25C 3/04
[52] U.S. Cl. ........................... 62/74; 62/347; 239/2.2
[58] Field of Search ............ 62/256, 74, 347, 121, 62/260, 259.1, 261, 259.3; 239/602, 600, 568, 2.2, 14.2; 98/36

[56] References Cited

U.S. PATENT DOCUMENTS

| 2,800,456 | 7/1957 | Shepherd | 252/70 |
| 2,968,164 | 1/1961 | Hanson | 62/74 |
| 3,042,638 | 7/1962 | Dragotta et al. | 260/23 |
| 3,251,194 | 5/1966 | Walker | 62/66 |
| 3,257,815 | 6/1966 | Brocoff et al. | 62/57 |
| 3,301,485 | 1/1967 | Tropeano et al. | 239/2 |
| 3,567,117 | 3/1971 | Eustis | 239/2 |
| 3,596,476 | 8/1971 | Jakob et al. | 62/347 |
| 3,636,725 | 1/1972 | MacCracken | 62/261 X |
| 3,751,935 | 8/1973 | MacCracken et al. | 62/75 |
| 3,964,682 | 6/1976 | Tropeano et al. | 239/25 |
| 4,121,431 | 10/1978 | Meudec et al. | 62/66 |
| 4,475,688 | 10/1984 | Hodges | 239/102.2 |
| 4,653,591 | 3/1987 | Marshall | 169/15 |
| 4,660,388 | 4/1987 | Greene, Jr. | 62/261 |

FOREIGN PATENT DOCUMENTS

| 363962 | 9/1981 | Austria . |
| 414570 | 8/1925 | Fed. Rep. of Germany . |
| 464521 | 8/1928 | Fed. Rep. of Germany . |
| 285998 | 3/1928 | United Kingdom . |

Primary Examiner—Harry B. Tanner
Attorney, Agent, or Firm—Foley & Lardner, Schwartz, Jeffery, Schwaab, Mack, Blumenthal & Evans

[57] ABSTRACT

A method of making artificial snow by mixing water with a surfactant, the surfactant preferably forming 0.03% to 5% of the mixture by weight; aerating the mixture to form a foam of bubbles; and freezing the foam to form the snow crystals. The mixture is preferably aerated with air in the ratio water:air in the range 1:2 to 1:3 (v/v). The foam of bubbles is frozen by laying it over a refrigerated grid laid over the skiing slope and the foam is preferably laid and frozen in layers until the desired depth of snow is achieved.

15 Claims, 1 Drawing Sheet

METHOD FOR MAKING ARTIFICIAL SNOW

BACKGROUND OF THE INVENTION (1) Field of the Invention

This invention relates to a method for making artificial snow, and to a snow skiing slope using such snow.

(2) Prior Art

In certain skiing resorts, man-made slopes are created using snow-machines which spray water and compressed air in a carefully controlled atmosphere (for both temperature and humidity) to create a blanket of snow. These machines are expensive to operate and the atmosphere is difficult to control, requiring expensive air conditioning equipment. The man-made slopes generally only extend the operating life of the slope by approximately 30 days.

In more temperate areas, artificial slopes are created using mats or mat-like layers of e.g. "Dendex", "Delta" or "Dri Sno" (trade marks) materials. These slopes require the use of special skis and poles and cannot truly re-create a snow-covered slope.

In International Application No. PCT/AU85/00267 (Bucceri) there is disclosed a method for making artificial snow by mixing water with a water swellable polymer to approximately 50–70% of the maximum water retention capacity of the polymer, aerating the mixture and freezing the mixture to produce snow crystals which can be laid on a refrigerated floor to form a skiing slope. This method has proved very effective but in certain applications the cost of the polymer is a disadvantage.

SUMMARY OF THE PRESENT INVENTION

It is an object of the present invention to provide a method of making artificial snow which is relatively simple and inexpensive.

It is a preferred object to provide a method where the snow can be laid in layers e.g. of different crystal size or where a layer of "powder snow" can be laid over a harder base snow.

It is a further preferred object to provide a method where the water can be recovered, and the snow refrozen, as required.

It is a still further preferred object to provide a ski-slope incorporating the snow produced by the present invention.

Other preferred objects of the present invention will become apparent from the following description.

In a broad aspect the present invention resides in a method for making artificial snow including the steps of:

mixing water with a surfactant (i.e. surface-active-agent or wetting agent);

agitating, aerating and/or bubbling gas through the mixture to form a foam or froth of water bubbles;

applying the foam or froth of bubbles to the area on which the artificial snow is to be created; and freeze the foam or froth of bubbles to form the snow crystals.

Suitable surfactants include soaps and detergents; sulphated, aliphatic or aromatic alcohols; linear or branched chain alkybenzene sulphonates; alkyarine sulphonates; sodium dodecylbenzene sulphonate; alkyl sulphonates; anionic, cationic and non-ionic surfactants.

Non-ionic surfactants are preferred as these form a resilient foam with small/minute bubbles which on freezing, produce high quality snow crystals down to powder snow size. Preferably the surfactant forming 0.03% to 5% of the mixture by weight. For environmental reasons, bio-degradable surfactants are preferred.

A bulk volume of the mixture may be agitated or aerated to produce a foam of bubbles on top of the mixture and the foam may be transferred or transported to the area where the snow is to be created. The mixture may be aerated by pumping air through the mixture at the ratio water:air 1:1 to 1:5 (v/v), the preferred aeration range being 1:2 to 1:3 (v/v).

Alternatively, the mixture may be mixed and sprayed from equipment of the type used for fire fighting foam (i.e. a foam generator), the foam of bubbles being sprayed over the area where the snow is to be created.

The foam may be laid over a skiing slope and frozen by the cold ambient air or may be laid over an area covered by a flexible cover or structure into which is pumped cold air or refrigerant. The foam may also be laid over artificial snow formed by the method of International Application No. PCT/AU85/00267 to form a layer of powder snow. Preferably the foam is laid over a refrigerated grid so that the bubbles break down themselves into the snow crystals. (The mixture is frozen from the bottom upwardly and the weight of the foam above the frozen bubbles assists in breaking down the bubbles into the snow crystals.)

Smaller bubbles may be preferred as these are more persistent (i.e. less likely to break before freezing) and more ice crystals are produced. The frozen bubbles may be compressed or crushed by passing a roller over the bubbles.

BRIEF DESCRIPTION OF THE DRAWINGS

To enable the invention to be fully understood, a number of preferred embodiments will now be described with reference to the accompanying drawings, in which.

DETAILED DESCRIPTION OF THE PREFERRED EMBODIMENTS

Figure 1:
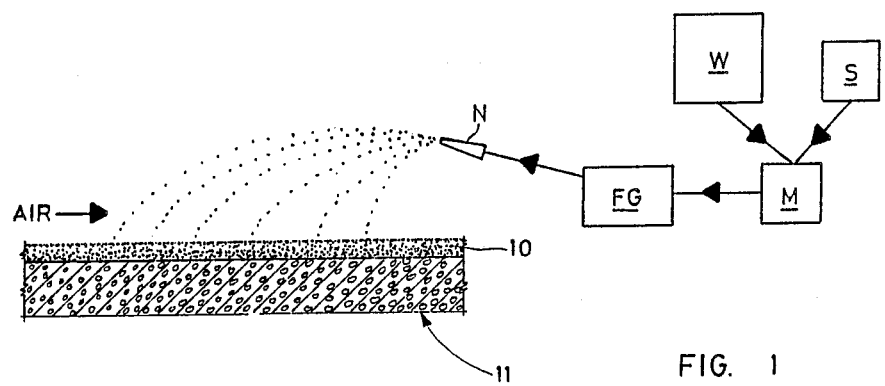
FIG. 1 is a schematic view of a first embodiment.

Referring to FIG. 1, water and linear chain alkylbenzene sulphonate are stored in separate W, S tanks, and are mixed in a mixing head M in a ratio of e.g. 97% water:3% sulphonate and sprayed from a foam nozzle N of a foam generator FG used to spray fire fighting foam, the foam mixture being sprayed in the form of a foam of bubbles, the foam being laid in layers 10 over the area of the proposed ski slope 11.

The bubbles have a skin with a low gas permeability and so the entrained air in the bubbles cannot readily escape. The ambient air e.g. below −5° C. causes the skins of the bubbles to freeze to form a frozen foam of bubbles with the air remaining entrained.

A roller is passed over the frozen layer to break the frozen bubble skins, releasing the air, and compressing the bubbles to form snow crystals.

The resulting artificial snow has skiing characteristics similar to natural snow and by varying the size of the bubbles, the nature of the snow in the different layers can be varied to suit the desired conditions.

Figure 2:
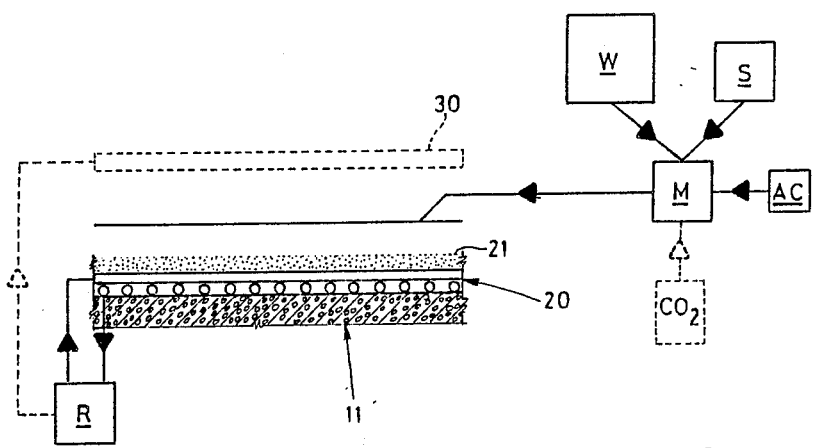
FIG. 2 is a schematic view of a second embodiment.

Referring to FIG. 2, water and the surfactant e.g. detergent from tanks, W,S are mixed in the mixing head M in the ratio 99% water:1% surfactant and the mixture is aerated by pumping air into the mixing head M from air air compressor AC at the ratio of water:air equals 1:2 (volume/volume).

The resultant foam of bubbles is laid over a frozen flexible grid system 20 (e.g. of the type sold under the "Icemat" trade mark by Calmac Manufacturing Corporation, of Englewood, N.J., U.S.A.—the subject of U.S. Pat. Nos. 3,751,935 and 3,893,507), the flexible grid system 20 being cooled by a refrigeration unit R. The bubbles in the foam freeze from the bottom upwards and break down into the snow crystals which form a layer 21 over the grid. To build up the desired thickness of snow, additional layers of foam are laid down and allowed to freeze to form snow crystals.

If the ambient air temperature is not low enough to freeze the foam of bubbles, cold air e.g. in the form of a curtain may be blown over the foam (see FIG. 1). Alternatively, a flexible cover 30 (see FIG. 2) may be laid over the foam and cold air or refrigerant (e.g. from refrigerator unit 12) may be pumped through or under the cover 30 to freeze the foam.

In another embodiment, the mixture may be aerated with air to form the foam and then frozen by passing $CO_2$ gas through the foam.

At the end of the ski season, when the air temperature is above 0° C., the snow will melt and if a biodegradable surfactant has been used, little, if any, ecological damage will occur to the surroundings. A catchment may be provided at the base of the ski-slope 11 to collect the melt snow.

To enable the skiing surface to be maintained, the surface may be "shaved", the removed snow melted and refrozen and laid or a fresh layer of the snow crystals may be laid over the existing surface. By controlling the percentage of surfactant and the aeration of the mixture, the fresh layer can comprise powder snow crystals.

It will be readily apparent to the skilled addressee that a wide range of suitable surfactants may be used and that many alternative methods for mixing the constituents, generating the foam of bubble, and laying the foam, are available without departing from the scope of the present invention defined in the appended claims.

I claim:

1. A method for making artificial snow including the steps of:
   mixing water with a surfactant;
   agitating, aerating and/or bubbling gas through the mixture to form a foam or froth of water bubbles;
   applying the foam or froth of bubbles as a substantially unfrozen layer to the area on which the artificial snow is to be created; and
   freezing the foam or froth of bubbles to form snow crystals.

2. A method as claimed in claim 1 wherein:
   the surfactant comprises one or more from the group: soaps and detergents; sulphated, aliphatic or aromatic alcohols; linear or branched chain alkylbenzene sulphonates; alkylarine sulphonates; sodium dodecylbenzene sulphonate; alkyl sulphonates; anionic, cationic and non-ionic surfactants.

3. A method as claimed in claim 1 or 2 wherein:
   the surfactant forms 0.03% to 5% of the mixture by weight.

4. A method as claimed in claim 1 wherein:
   the mixture is aerated by air in the ratio water:air in the range 1:1 to 1:5 (volume/volume).

5. A method as claimed in claim 4 wherein:
   the ratio water:air is in the range 1:2 to 1:3 (volume/volume).

6. A method as claimed in claim 1 wherein:
   the foam of bubbles is laid over a refrigerated grid system on a skiing slope, the bubbles in the foam freezing and breaking down into the snow crystals.

7. A method as claimed in claim 1 wherein:
   the foam of bubbles is laid over a skiing slope and the foam of bubbles is frozen by the cold ambient air.

8. A method as claimed in claim 1 wherein:
   the foam of bubbles is laid over a skiing slope and is covered by a flexible cover, and cold air or refrigerant is pumped through or under the cover to freeze the foam of bubbles.

9. A method as claimed in claim 1 wherein:
   the foam of bubbles is frozen by pumping $CO_2$ gas through the aerated mixture.

10. A method as claimed in claim 1 wherein:
    the mixture is aerated in a fire fighting foam generator and the foam of bubbles is sprayed over the skiing slope from a nozzle attached to the foam generator.

11. A method as claimed in claim 1, wherein:
    the frozen bubbles are compressed or crushed to form the snow crystals.

12. A method as claimed in claim 8, wherein:
    said refrigerant is pumped through the cover to freeze the foam.

13. A method as claimed in claim 1, wherein:
    the foam of bubbles is laid over a skiing slope and is covered by a flexible cover, and cold air is pumped under the cover to freeze the foam of bubbles.

14. A method as claimed in claim 13, wherein:
    said cold air is pumped through the cover to freeze the foam of bubbles.

15. A skiing slope including:
    a refrigerated floor or grid; and
    at least one layer of snow crystals covering the floor or grid, the snow crystals being made by a method including the steps of:
    mixing water with a surfactant;
    forming a foam of the resulting mixture;
    applying the foam as a substantially unfrozen layer to cover the floor or grid; and
    freezing the foam to form snow crystals.

* * * * *